(12) United States Patent
Matthews et al.

(10) Patent No.: US 9,571,403 B2
(45) Date of Patent: Feb. 14, 2017

(54) PACKET MARKING FOR FLOW MANAGEMENT, INCLUDING DEADLINE AWARE FLOW MANAGEMENT

(71) Applicant: Broadcom Corporation, Irvine, CA (US)

(72) Inventors: William Brad Matthews, San Jose, CA (US); Vahid Tabatabaee, Cupertino, CA (US); Bruce Hui Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 35 days.

(21) Appl. No.: 13/841,966

(22) Filed: Mar. 15, 2013

(65) Prior Publication Data
US 2014/0219087 A1    Aug. 7, 2014

Related U.S. Application Data

(60) Provisional application No. 61/761,818, filed on Feb. 7, 2013.

(51) Int. Cl.
*H04L 12/26* (2006.01)
*H04L 12/851* (2013.01)
*H04L 12/841* (2013.01)
*H04L 12/833* (2013.01)

(52) U.S. Cl.
CPC .......... *H04L 47/2441* (2013.01); *H04L 47/28* (2013.01); *H04L 47/31* (2013.01)

(58) Field of Classification Search
CPC ...... H04W 24/00; H04W 24/02; H04W 24/10; H04W 24/08; H04W 76/048; H04L 43/04; H04L 43/10; H04L 43/00; H04L 43/0876; H04L 43/08; H04L 49/30; H04L 49/351; H04L 49/357; H04L 45/00; H04L 49/10
USPC ......... 370/231, 241, 419, 235; 709/224, 217
See application file for complete search history.

(56) References Cited

U.S. PATENT DOCUMENTS

| 6,731,613 | B1 * | 5/2004 | Provance | H04W 52/343 370/230 |
| 8,149,730 | B1 * | 4/2012 | Aybay | H04L 12/2697 370/253 |
| 8,948,009 | B1 * | 2/2015 | Hasan | H04L 47/193 370/231 |

(Continued)

OTHER PUBLICATIONS

Ramakrishnan, K., et al., The Addition of Explicit Congestion Notification (ECN) to IP, Network Working Group, Sep. 2001 (57 pages).

*Primary Examiner* — Andrew Chriss
*Assistant Examiner* — Atique Ahmed
(74) *Attorney, Agent, or Firm* — Brinks Gilson & Lione (57) ABSTRACT

Network devices facilitate flow management through packet marking. The network devices may be switches, routers, bridges, hubs, or any other network device. The packet marking may include analyzing received packets to determine when the received packets meet a marking criterion, and then applying a configurable marking function to mark the packets in a particular way. The marking capability may facilitate deadline aware end-to-end flow management, as one specific example. More generally, the marking capability may facilitate traffic management actions such as visibility actions and flow management actions.

20 Claims, 7 Drawing Sheets

(56) References Cited

U.S. PATENT DOCUMENTS

| | | | |
|---|---|---|---|
| 2005/0008013 A1* | 1/2005 | Jamieson | H04J 3/14 370/389 |
| 2006/0187836 A1* | 8/2006 | Frey | H04L 12/5693 370/235 |
| 2006/0203721 A1* | 9/2006 | Hsieh | H04L 12/4633 370/229 |
| 2007/0061465 A1* | 3/2007 | Kim et al. | 709/226 |
| 2007/0280261 A1* | 12/2007 | Szymanski | H04L 12/5601 370/395.4 |
| 2008/0112403 A1* | 5/2008 | Larsen et al. | 370/389 |
| 2009/0182874 A1* | 7/2009 | Morford | H04L 41/5025 709/224 |
| 2009/0196194 A1* | 8/2009 | Paloheimo | H04L 45/26 370/252 |
| 2010/0118885 A1* | 5/2010 | Congdon | 370/419 |
| 2010/0316049 A1* | 12/2010 | Diab | G06F 13/385 370/389 |
| 2011/0075563 A1* | 3/2011 | Leung | H04L 12/66 370/236 |
| 2011/0211449 A1* | 9/2011 | Attar | H04L 47/34 370/235 |
| 2011/0273995 A1* | 11/2011 | Ahn | H04L 41/5003 370/241 |
| 2012/0148035 A1* | 6/2012 | Katis et al. | 379/88.14 |
| 2012/0307829 A1* | 12/2012 | Hyoudou | H04L 47/17 370/392 |
| 2013/0204965 A1* | 8/2013 | Masputra | H04L 47/60 709/217 |
| 2014/0095902 A1* | 4/2014 | Rorai | G06F 1/3278 713/320 |

* cited by examiner

PACKET MARKING FOR FLOW MANAGEMENT, INCLUDING DEADLINE AWARE FLOW MANAGEMENT

PRIORITY CLAIM

This application claims priority to U.S. Provisional Application Ser. No. 61/761,818, filed Feb. 7, 2013, titled "Packet Marking For Flow Management, Including Deadline Aware Flow," which is incorporated herein by reference in its entirety.

TECHNICAL FIELD

This disclosure relates to networking. This disclosure also relates to marking network packets to facilitate network flow visibility and management actions, and to facilitate deadline aware flow management, and other features.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in deadline aware end-to-end flow management, will further enhance performance of data networks.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Example Architecture

Figure 1:
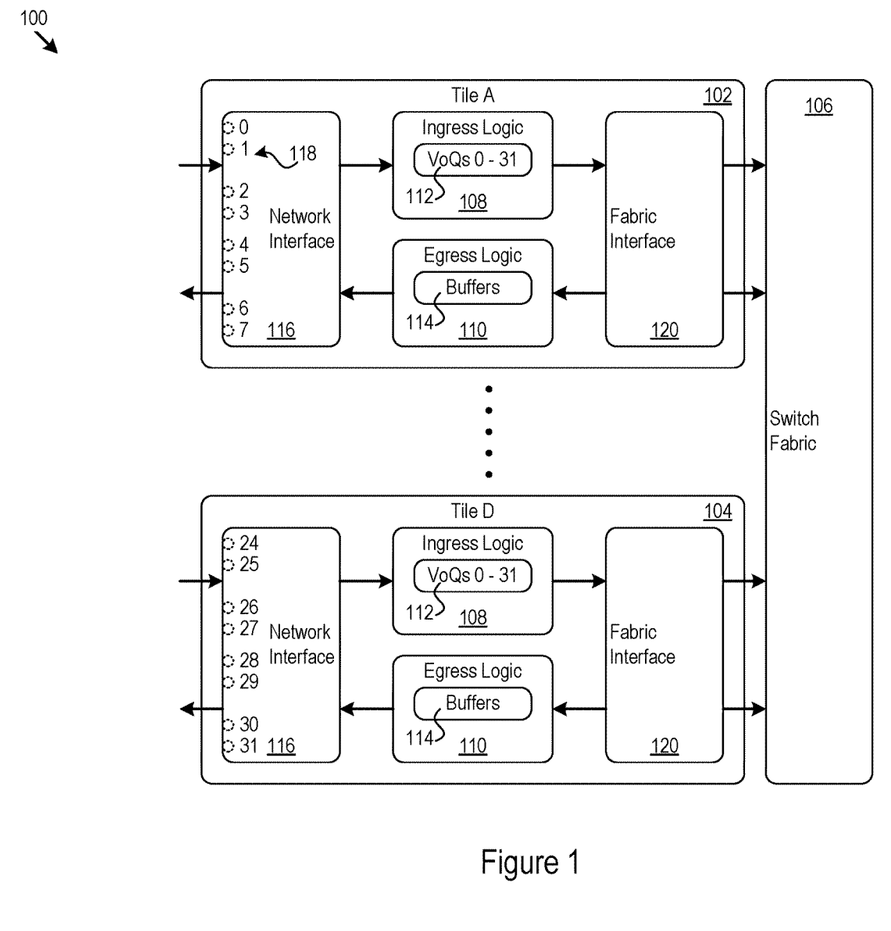
FIG. 1 shows an example of a switch architecture that may include packet marking functionality.

FIG. 1 shows an example of a switch architecture 100 that may include packet marking functionality. The description below provides a backdrop and a context for the explanation of packet marking, which follows this example architecture description. Packet marking may be performed in many different network devices in many different ways. Accordingly, the example architecture 100 is presented as just one of many possible network device architectures that may include packet marking functionality, and the example provided in FIG. 1 is one of many different possible alternatives. The techniques described further below are not limited to any specific device architecture.

The architecture includes several tiles, such as the tiles specifically labeled as tile A 102 and the tile D 104. In this example, each tile has processing logic for handling packet ingress and processing logic for handling packet egress. A switch fabric 106 connects the tiles. Packets, sent for example by source network devices such as application servers, arrive at the network interfaces 116. The network interfaces 116 may include any number of physical ports 118. The ingress logic 108 buffers the packets in memory buffers. Under control of the switch architecture 100, the packets flow from an ingress tile, through the fabric interface 120 through the switching fabric 106, to an egress tile, and into egress buffers in the receiving tile. The egress logic sends the packets out of specific ports toward their ultimate destination network device, such as a destination application server.

Each ingress tile and egress tile may be implemented as a unit (e.g., on a single die or system on a chip), as opposed to physically separate units. Each tile may handle multiple ports, any of which may be configured to be input only, output only, or bi-directional. Thus, each tile may be locally responsible for the reception, queueing, processing, and transmission of packets received and sent over the ports associated with that tile.

As an example, in FIG. 1 the tile A 102 includes 8 ports labeled 0 through 7, and the tile D 104 includes 8 ports labeled 24 through 31. Each port may provide a physical interface to other networks or network devices, such as through a physical network cable (e.g., an Ethernet cable). Furthermore, each port may have its own line rate (i.e., the rate at which packets are received and/or sent on the physical interface). For example, the line rates may be 10 Mbps, 100 Mbps, 1 Gbps, or any other line rate.

The techniques described below are not limited to any particular configuration of line rate, number of ports, or number of tiles, nor to any particular network device architecture. Instead, the marking techniques described below are applicable to any network device that incorporates the analysis logic described below. The network devices may be switches, routers, bridges, blades, hubs, or any other network device that handle routing packets from sources to destinations through a network. The network devices are part of one or more networks that connect, for example, application servers together across the networks. The network devices may be present in one or more data centers that are responsible for routing packets from a source to a destination.

The tiles include packet processing logic, which may include ingress logic 108, egress logic 110, analysis logic, and any other logic in support of the functions of the network device. The ingress logic 108 processes incoming packets, including buffering the incoming packets by storing the packets in memory. The ingress logic 108 may define, for example, virtual output queues 112 (VoQs), by which the ingress logic 108 maintains one or more queues linking packets in memory for the egress ports. The ingress logic 108 maps incoming packets from input ports to output ports, and determines the VoQ to be used for linking the incoming packet in memory. The mapping may include, as examples, analyzing addressee information in the packet headers, and performing a lookup in a mapping table that matches addressee information to output port(s).

The egress logic 110 may maintain one or more output buffers 114 for one or more of the ports in its tile. The egress logic 110 in any tile may monitor the output buffers 114 for congestion. When the egress logic 110 senses congestion (e.g., when any particular output buffer for any particular port is within a threshold of reaching capacity), the egress logic 110 may throttle back its rate of granting bandwidth credit to the ingress logic 108 in any tile for bandwidth of the congested output port. The ingress logic 108 responds by reducing the rate at which packets are sent to the egress logic 110, and therefore to the output ports associated with the congested output buffers.

The ingress logic 108 receives packets arriving at the tiles through the network interface 116. In the ingress logic 108, a packet processor may perform link-layer processing, tunnel termination, forwarding, filtering, and other packet processing functions on the received packets. The packets may then flow to an ingress traffic manager (ITM). The ITM writes the packet data to a buffer, from which the ITM may decide whether to accept or reject the packet. The ITM associates accepted packets to a specific VoQ, e.g., for a particular output port. The ingress logic 108 may manage one or more VoQs that are linked to or associated with any particular output port. Each VoQ may hold packets of any particular characteristic, such as output port, class of service (COS), priority, packet type, or other characteristic.

The ITM, upon linking the packet to a VoQ, generates an enqueue report. The analysis logic, described below, may receive the enqueue report as a signal that a new packet has arrived, and that may cause the analysis logic to mark the arrived packet with a packet marker, and take other actions. The ITM may also send the enqueue report to an ingress packet scheduler. The enqueue report may include the VoQ number, queue size, and other information. The ITM may further determine whether a received packet should be placed on a cut-through path or on a store and forward path. If the receive packet should be on a cut-through path, then the ITM may send the packet directly to an output port with as low latency as possible as unscheduled traffic, and without waiting for or checking for any available bandwidth credit for the output port. The ITM may also perform packet dequeueing functions, such as retrieving packets from memory, forwarding the packets to the destination egress tiles, and issuing dequeue reports. The ITM may also perform buffer management, such as admission control, maintaining queue and device statistics, triggering flow control, and other management functions.

In the egress logic 110, packets arrive via the fabric interface 120. A packet processor may write the received packets into an output buffer 114 (e.g., a queue for an output port through which the packet will exit) in the egress traffic manager (ETM). Packets are scheduled for transmission and pass through an egress transmit packet processor (ETPP) and ultimately out of the output ports.

The ETM may perform, as examples: egress packet reassembly, through which incoming cells that arrive interleaved from multiple source tiles are reassembled according to source tile contexts that are maintained for reassembly purposes; egress multicast replication, through which the egress tile supports packet replication to physical and logical ports at the egress tile; and buffer management, through which, prior to enqueueing the packet, admission control tests are performed based on resource utilization (i.e., buffer and packet descriptors). The ETM may also perform packet enqueue/dequeue, by processing enqueue requests coming from the ERPP to store incoming frames into per egress port class of service (CoS) queues prior to transmission (there may be any number of such CoS queues, such as 2, 4, or 8) per output port.

The ETM may also include an egress packet scheduler to determine packet dequeue events, resulting in packets flowing from the ETM to the ETPP. The ETM may also perform egress packet scheduling by arbitrating across the outgoing ports and COS queues handled by the tile, to select packets for transmission; flow control of egress credit scheduler (ECS), by which, based on total egress tile, per egress port, and per egress port and queue buffer utilization, flow control is sent to the ECS to adjust the rate of transmission of credit grants (e.g., by implementing an ON/OFF type of control over credit grants); flow control of tile fabric data receive, through which, based on total ETM buffer utilization, link level flow control is sent to the fabric interface 120 to cease sending any traffic to the ETM.

Packet Marking

Several examples of packet marking are given next as an introduction. A network device may perform packet marking to facilitate network flow management. The packet marking may, for example, recognize or indicate deadline aware network flows and take marking actions that help the deadline aware network flow reach its destination on time. As just one example, the network device may connect a source device to a destination device through the network device. In other words, the network device need not be an endpoint at which the network flow originates or terminates, but instead the network device may be any network device (e.g., a switch, router, or hub) along the path from the source device to the destination device.

Continuing the example, the network device receives a network packet that is part of a network flow. The network packet is destined for the destination device and is passing through the network device toward the destination device. The network device matches the network packet against a classification criterion to determine how to classify the network flow. Example classifications include a deadline aware network flow and a background network flow. Any network device may implement additional or different classifications. As will be discussed in more detail below, a network device may establish any matching criteria that establish a network flow as a particular flow classification. A deadline aware network flow may be a network flow that needs to meet timing deadlines or is otherwise time sensitive, such as a network flow to quickly deliver advertisements. A background network flow may be a network flow for which no specific timing deadlines are established or for which there is no particular timing sensitivity, such as a network flow that delivers webpage information.

When the network flow is classified as a deadline aware network flow or a background network flow, the network device may determine whether to execute a marking function for the network packet, and, when it is determined to execute the marking function, execute the marking function to obtain a packet marker for the network packet. The network device adds the packet marker to the network packets before the network packet is sent out of the network device.

The network device may implement many different marking functions of many different variables. In one implementation, the network device selects a marking function that generates different packet markers for different deadline proximities of a deadline applicable to the network flow. The packet marker may represent that the network flow is considered approaching with respect to the deadline, is considered on-time with respect to the deadline, or is considered early with respect to the deadline. Classification thresholds may be set to ascertain whether the network flow is considered approaching, on-time, or early, e.g., when the deadline is closer than the approaching threshold or farther away than the early threshold, then the network flow may be classified as approaching or early, respectively. Furthermore, the network device may determine that a deadline applicable to the network flow has passed. In that case, the network device may drop the network packet, and also not execute the marking function. Any of the deadline criteria, network flow deadlines applicable to any network flow, classification thresholds, or other operational parameters may be configured in a memory in the network device, received at the network device from an external device, determined by network packet inspection (such as by obtaining the parameters from packet fields in the network packet), determined based on a processing or resource availability of the network device, or in other ways.

The packet markers may travel with the network packet out of the network device and onto other network devices toward the ultimate destination for the network flow. Either the network device that applied the packet marker, or any other device that receives the marked packet, may take a flow management action when it recognizes the packet marker. For example, the packet marker may represent a request to slow the network flow with which the network packet is associated. In that case, a network device may reduce the rate of transmission of network packets that constitute the network flow. When, for example, a background network flow is marked, the result may be that the background network flow rate is reduced, leaving more bandwidth for the deadline aware network flow, and helping to allow the deadline aware network flow to complete in a timely manner.

The management action may be internal to the network device that marked the packet. Thus, the network device may, for example, classify and mark the network packet upon reception, and then take a flow management action internal to the network device when the network packet is further processed (e.g., place the packet in a high or low priority queue). The network device may then remove its own packet marker before sending the network packet out of the network device.

As another example, a network device may include a packet buffer which may be one or multiple physical or logical buffers implemented in one or multiple physical or logical memories. The network device may for example, be on a path between a source device and a destination device (e.g., the network device is an intermediate device between endpoints of a network flow). The packet buffer may store network packets of a first network flow and network packets of a second network flow handled by the network device. The network device includes analysis logic connected to the packet buffer. The analysis logic obtains an analysis criterion and classifies, in view of the analysis criterion, the first network flow, the second network flow, or both network flows as a deadline aware network flow. The analysis logic executes a packet marking action in the device in response to the analysis performed by the analysis logic, and more specifically to classifying a network flow as a deadline aware network flow.

The packet marking action may include marking deadline aware network flow packets with a packet marker. The analysis logic may execute the packet marking action at any point, such as when the packet is in the packet buffer, when passing through any logic of a network device, when in a cut-through path, etc. The packet marker may be interpreted as or signify a request for reduced throughput for the deadline aware network flow. The analysis logic may also determine a deadline applicable to the deadline aware network flow. Knowing the deadline, the analysis logic may then mark the deadline aware network flow packets with a packet marker that depends upon the deadline applicable to the deadline aware network flow. The packet marker may represent that the deadline aware network flow is early or on-time with respect to the deadline, as examples.

In addition, the analysis logic may also classify the first network flow, the second network flow, or both network flows as a background network flow. Then, the packet marking action may include marking at least one background network flow packet in the packet buffer with a packet marker. The packet marker may signify throughput reduction for the background network flow.

Figure 2:
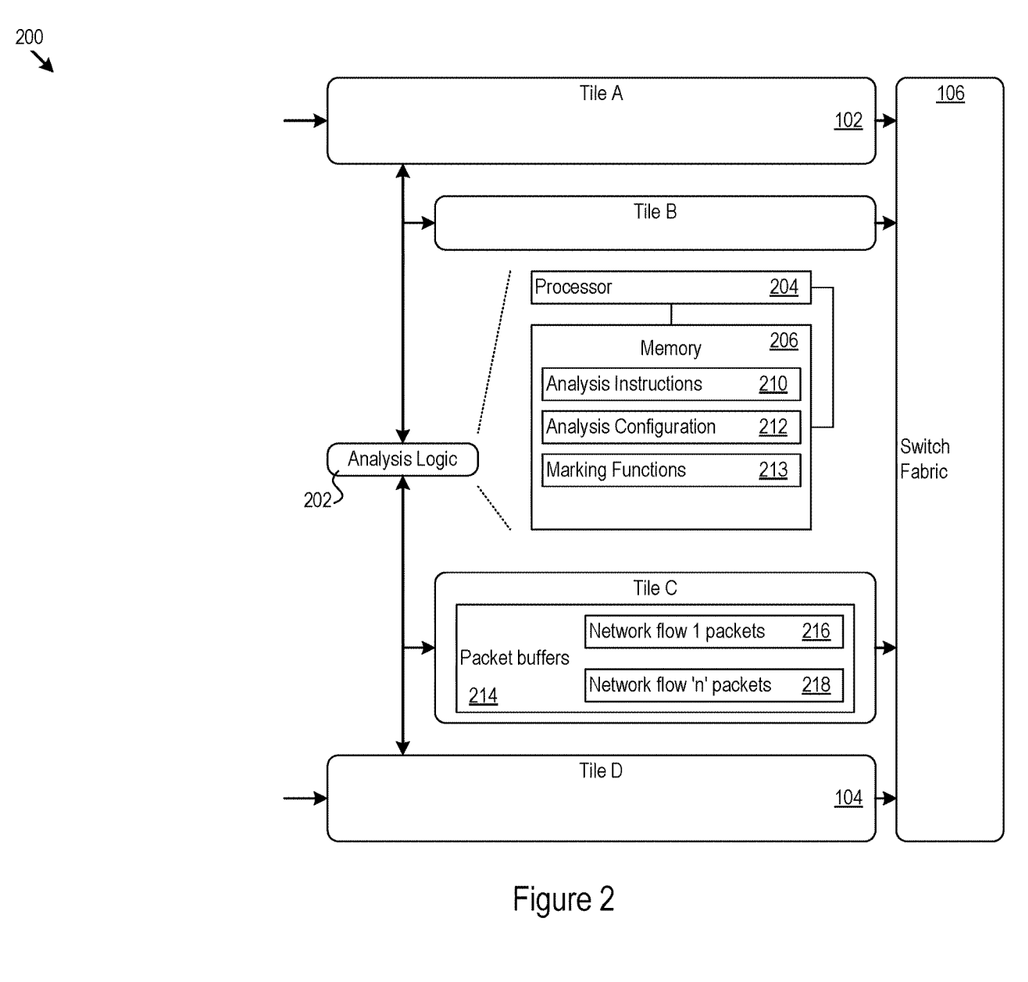
FIG. 2 is an example switch architecture extended to include packet marking functionality.

FIG. 2 shows an example architecture 200 which is extended to include the analysis logic 202. The analysis logic 202 may be implemented in any combination of hardware, firmware, and software. The analysis logic 202 may be implemented at any one or more points in the architecture 100, or in other architectures in any network device. As examples, the analysis logic 202 may be a separate controller or processor/memory subsystem. Alternatively, the analysis logic 202 may be incorporated into, and share the processing resources of the ingress logic 108, egress logic 110, fabric interfaces 120, network interfaces 116, or switch fabric 106.

In the example of FIG. 2, the analysis logic 202 includes a processor 204 and a memory 206. The memory 206 stores analysis instructions 210, analysis configuration information 212, and marking functions 213. The analysis instructions 210 may execute packet marking when specified conditions are met on any network packets present in the network device. In the example of FIG. 2, for example, the packet buffer 214 holds network packets for several different network flows. Two sets of network packets are labeled as the network flow 1 packets 216 and the network flow 'n' packets 218.

The analysis configuration information 212 may guide the operation of the analysis instructions 210. For example, the analysis configuration information 212 may specify the packet characteristics (e.g., whether in the header or payload) that characterize a network packet as part of a deadline aware network flow, as part of a background network flow, or as any other type of network flow. In that regard, the analysis configuration information 212 may include any number of packet criteria specifying how to classify a network packet. Table 1, below, shows some examples of classification criterion in the analysis configuration information 212.

TABLE 1

| Criterion | Example |
| --- | --- |
| Source/ Destination Port | Source or destination port numbers that characterize a network packet as belonging to a background network flow, deadline aware network flow, or other type of flow. |
| Header Flags | Any flags in the header or payload that specifically indicate the classification of a network packet due to the flag being set or cleared. |
| Source/ Destination Address | Source or destination network addresses that characterize a network packet as belonging to a background network flow, deadline aware network flow, or other type of flow. |
| Data patterns and positions | Data patterns and their position within the network packet (e.g., in the header or payload), that, if found in the network packet, indicate that the network packet part of a network flow of a certain type. |
| User defined | Any user defined matching criteria may be established in the network device. The matching criteria may specify data patterns or other characteristics of packet fields in the header and payload as examples. |

The analysis configuration information 212 may also be implemented as table lookups on a specified set of packet fields. In other implementations, the analysis logic 202 may include a Ternary Content Addressable Memory (TCAM) or other type of CAM and may perform TCAM lookups on user configured or specified fields or data, to identifying matching packets for marking that are present in the packet buffers.

The analysis instructions 210 may apply a packet marker to any network packets that are part of a particular network flow. The marking functions 213 may generate the packet markers as a function of one more variables. The marking functions 213 may by updated at any time by the network device, or by a supervisory device external to the network device. The marking functions may take into consideration a wide range of variables, as examples: deadline proximity, network device status (e.g., power consumption), buffer fill levels, and latency through the network device. Accordingly, for example, the marking functions may vary according to power consumption, or load, or buffer levels, so that the packet markers reflect also the current power consumption, load, or buffer levels, and downstream devices may take actions that taking into consideration these factors. As a specific example, a marking function may mark background network flows for rate throttling to keep network device power consumption under a specified power threshold. Accordingly, the more that power consumption rises above the power threshold, the more aggressive the marking function may apply packet markers to background packets. If power consumption is more important that deadline sensitivity, the same marking action may be taken with deadline aware network flows as well.

The packet marker may apply to all or some subset (e.g., one in ten) of such packets. The number of packets to which the analysis instructions 210 applies the packet markers may be a function of network flow deadlines. As one example, as the completion deadline for a deadline aware network flow approaches, the analysis logic 202 may apply packet markers to a greater and greater percentage of network packets in a background network flow. The expectation is that a network device along the path (including at the endpoints) will recognize the packet marker and reduce the priority or rate at which the background network flow packets are send, thereby providing additional throughput for the deadline aware network flow.

Packets typically include a header and a payload. Either section of the packet may hold the packet marker. The packet marker may be one or more bits in a data field in the packet header or payload, as an example the ECN (Explicit Congestion Notification) bits in Transmission Control Protocol (TCP) and Internet Protocol (IP) headers. The analysis logic 202 adds the packet marker in data fields in the packet at any point in the processing of the packet in the network device. As example, the network device may add packet markers to a network packet when the packet is in the ingress buffers 108, in the egress buffers 110, at the fabric interface 120, in the switching fabric 106, or at the network interface 118. Accordingly, the packet destination, e.g., an application server at the network flow endpoint, may react to the packet marker by adjusting throughput of the network flow. For example, increasing throughput reduction may happen with increasing percentage of network packets in the network flow that bear packet markers. In addition, a multiple bit packet marker may specify and distinguish among various levels of marking. Thus, one marking pattern may flag the network flow for modest throttling, while another pattern may flag the network flow for aggressive throttling.

Figure 3:
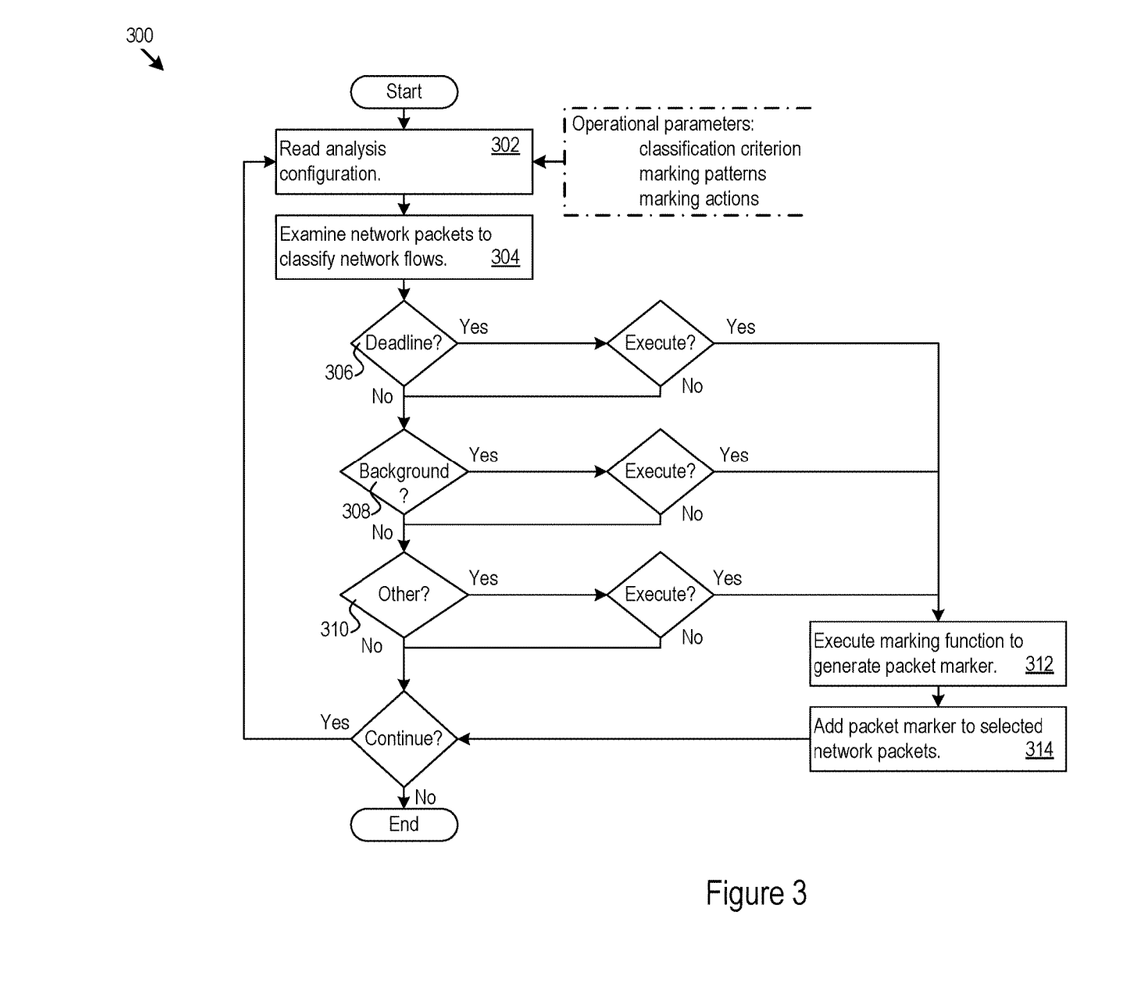
FIG. 3 shows example logic for deadline aware network flow marking.

FIG. 3 shows an example of logic 300 that the analysis logic 202 may implement to execute deadline aware packet marking. The analysis logic 202 reads the analysis configuration 212 (302), which may include operational parameters that specify a classification criterion (e.g., those shown in Table 1), marking patterns, marking functions, marking actions, and other marking operational parameters. The logic 300 examines network packets to classify network flows to which the network packets belong (304).

When the analysis logic 300 finds that the network flows include a deadline aware network flow (306), or a background network flow (308), or any other defined type of network flow (310), then the analysis logic decide whether to mark packets. If so, then the analysis logic 300 executes a selected marking function to generate a packet marker (312). The analysis logic 300 may also add the packet marker to selected network packets (314). The marking function may implement a sampling probability curve that includes steps, non-linear (e.g., exponential), linear, or other characteristics as a function of deadline state, deadline proximity, network device status (e.g., power consumption) or other variables. Accordingly, the marking function may also determine whether to mark the packet with the packet marker, so that, overall, the number of packets marked meets the probability curve.

Figure 4:
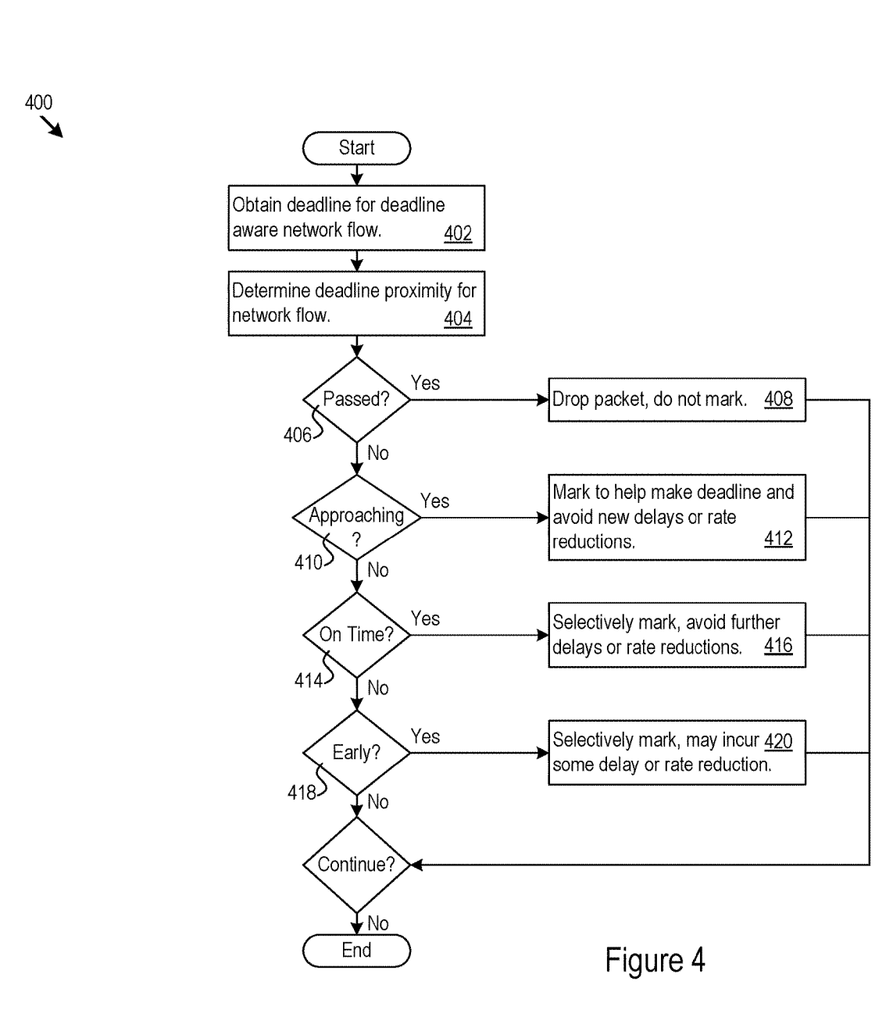
FIG. 4 shows example logic for marking according to deadline proximity.

A specific example is given in FIG. 4, which shows logic 400 for taking marking actions based on deadline proximity. The logic 400 obtains a deadline applicable to a deadline aware network flow, as examples a specific number of units of time left, such as 20 ms, or a specific date and time deadline for completion. From the deadline, the logic 400 determines the deadline proximity, e.g., with reference to a time source available to the network device, such as a real time clock.

In the example of FIG. 4, four proximity categories are defined. There may be additional, fewer, or different proximity categories. If the deadline has passed (406), then the logic 400 may decide not to mark the network packet at all, and instead drop the packet (408). This may happen when there is a little or no value to delivering late packets. If the deadline is approaching (410), then the logic 400 may mark network packets to help make the deadline, such as by avoiding new delays or rate reductions for the deadline aware network flow (412). In particular, the logic 400 may mark background network flows or other types of network flows so that the background network flows are delayed or rate reduced in order to provide additional throughput for the deadline aware network flow. The logic 400 may, as one example, mark and rate reduce a different deadline aware network flow when the different deadline aware network flow is, for example, early. The logic 400 may, for example, mark a greater percentage of background network flow packets, as the deadline for the deadline aware network flow draws nearer.

When the deadline aware network flow is on-time (414), the logic 400 may cause selective marking. The goal may be, for example, to avoid further delays or rate reductions for the deadline aware network flow, so that it continues to be on-time. Accordingly, the analysis logic 202 may stop marking the deadline aware network flow if it was previously doing so, and may continue to mark some background network flow packets to ensure that enough throughput is provided to keep the deadline aware network flow on-time. When the deadline aware network flow is early (418), the analysis logic 202 may selectively mark as well (420). However, in this instance, the analysis logic 202 may mark the network packets in the deadline aware network flow itself. The marking may cause the deadline aware network flow to experience delay or rate reduction, however because the deadline aware network flow is still early, the delay or rate reduction may be tolerated.

The marking functions 213 may take into account deadline proximity as well as network flow type (and other variables). Additional variables include buffer (e.g., queue) fill levels. When, for example, when buffers are less than some predefined threshold full, then the marking function may less aggressively mark or not mark at all, as low fill level may be considered evidence that the network device has the capacity to handle any incoming network flow without substantial delay. In addition, proximity thresholds may be set and stored in the memory, e.g., as part of the analysis configuration 212.

Figure 5:
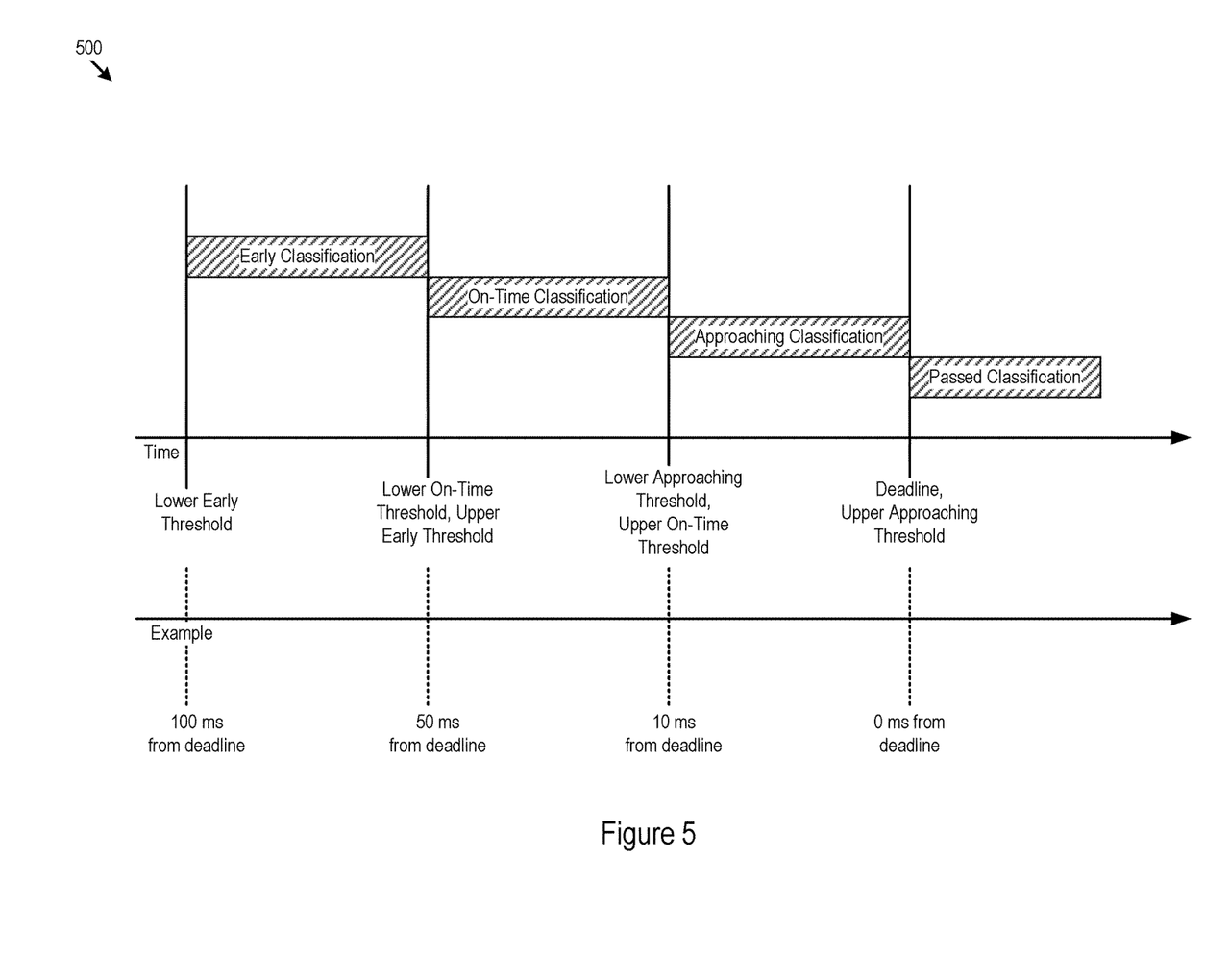
FIG. 5 shows examples of proximity deadline thresholds.

FIG. 5 shows that the proximity thresholds 500 may set upper and lower thresholds for testing against the deadline to determine the deadline proximity. For example, a deadline aware network flow for which the deadline is more than 100 ms but less than 50 ms away may be considered an early network flow. As another example, a network flow for which the deadline is greater than 0 ms and less than 10 ms away may be classified as approaching.

Additional Examples of Packet Marking

The analysis logic 202 is not restricted to marking in response to deadline aware or background network flows. Instead, the analysis logic 202 may mark network packets for many other reasons.

Figure 6:
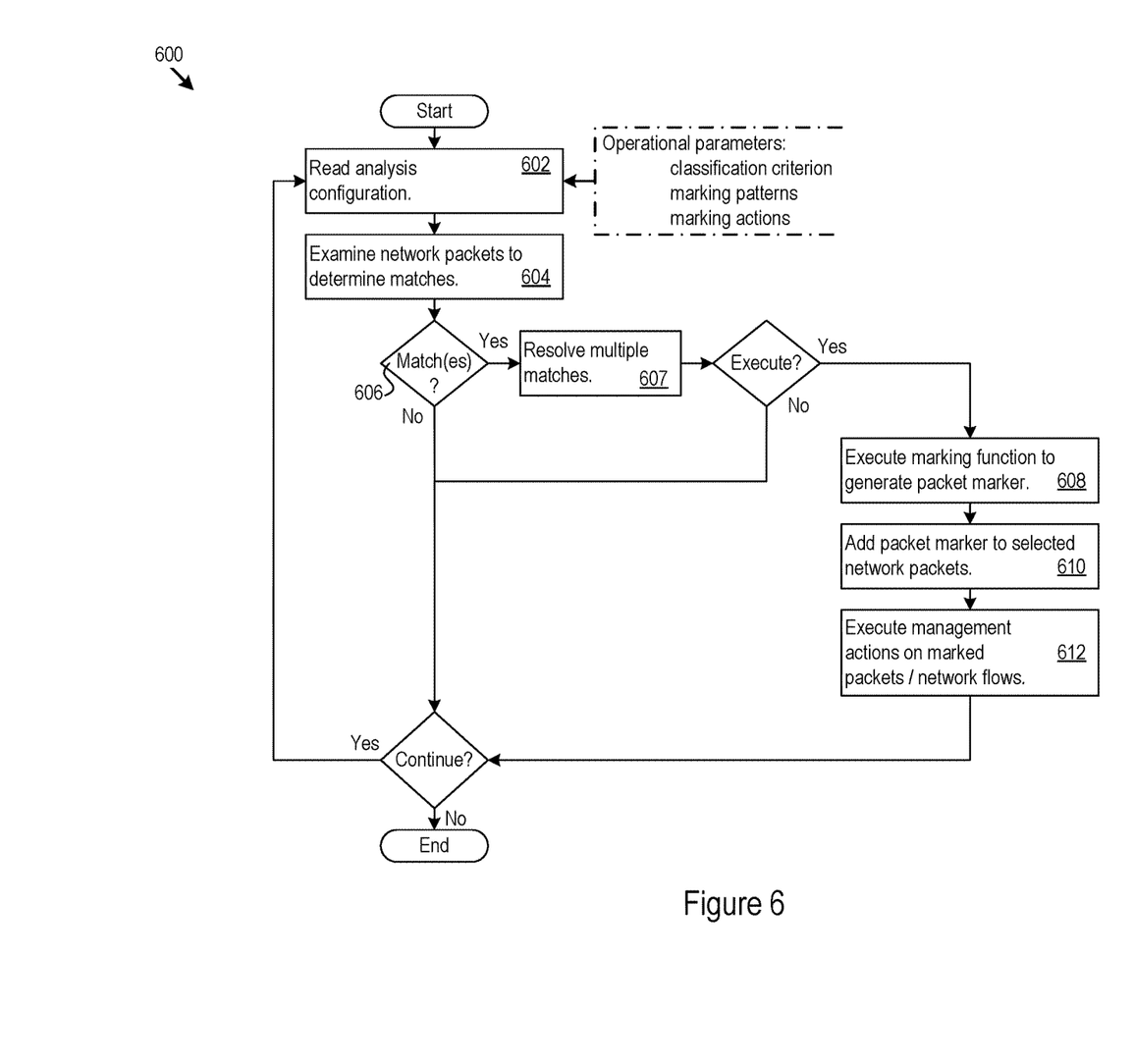
FIG. 6 shows an example of packet marking logic for network flow visibility and flow management.

FIG. 6 shows an example of logic 600 that the analysis logic 202 may implement for other types of packet marking. The logic 600 reads the analysis configuration 212 (602), which may include operational parameters that specify classification criterion (e.g., those shown in Table 1), marking patterns, marking functions, marking actions, and other marking operational parameters. The logic 600 examines network packets to determine whether there any matching network packets (604). As noted above, the logic 600 may perform table lookups, execute TCAM searches, or take other matching actions.

The logic 600 finds matching network packets (606), and multiple different search criteria may match. That is, the matching may find multiple results. Note that the marking function and the management actions may vary according to which criteria matched. Accordingly, the logic 600 may resolve multiple matches (607). As one example, the logic 600 may resolve matches according to a priority level associated with the matching criteria, according to the degree, strength, or certainty of the match, in the order in which the match was found (e.g., take the first or last match), at random, by user-specified tie breaker criteria configured in the network device, or in any other manner.

When matches are found, the logic 600 determines whether to mark the matching network packets or one or more other network packets. If so, then the logic 600 may select and execute a marking function to generate a packet marker (608). Alternatively, the logic 600 may retrieve an operator specified value for the packet marker. The operator specified values may be present in the analysis configuration 212.

The packet marker may be a class tag that is added to the network packet to signify that the network packet has met certain matching criteria. The logic 600 may also add the packet marker to selected network packets (610). Again, the marking function may implement a sampling probability curve that includes steps, non-linear (e.g., exponential), linear, or other characteristics as a function of deadline state, deadline proximity, network device status (e.g., power consumption) or other variables. Accordingly, the marking function may also determine whether to mark the packet with the packet marker, so that, overall, the number of packets marked adheres to the distribution defined by the probability curve. Any of the marked packets, or the network flows to which they belong, may be the subject of management actions (612), which are described in more detail next.

Management actions include, as just two examples, visibility actions and flow management actions. Visibility actions tend to provide increased insight into the network behavior and application performance. Flow management actions tend to provide enhanced controls for managing flow at the device, application, and network levels. Furthermore, the network device may link multiple management actions together. In other words, the management action taken on a marked network packet may be a sequence of management actions. One example is to first perform a flow redirection, and then annotate the network packet with status information (e.g., buffer levels, power consumption, or other statistics).

Any network device (including the network device that marked the network packet) may execute management actions. As examples, the network device may execute visibility actions that include: trapping the network packet for analysis; adding a timestamp for synchronization (e.g., a global synchronization via a IEEE 1588 message mechanism); taking a snapshot of buffer (e.g., queue) sizes and fill level; recording hop, path, source, or destination information for analysis; and sampling network flow and collecting statistical measures, such as measuring delay, jitter, or loading, or monitoring and recording flow control events). In a scenario, for instance, where an email application owner complains about higher than expect delay, the analysis logic 202 may be configured (e.g., by a network operator) to match network packets that are part of the email application network flow, and apply a packet marker. Then, the network device may sample the network flows that have the specified packet marker and collect delay and jitter statistics. The network device may deliver the statistics to an analysis system for review.

With regard to the flow management actions, examples include: elevating or reducing priority of network flows; specifying egress queues or ports for the marked network packets and network flow to travel through; and redirecting the marked network flow to a port with less loading. Further examples of flow management actions include end-to-end oriented flow management actions, such as marking network packets for end-to-end bandwidth management (including deadline aware network flow management).

As an example of flow management, consider a concern raised by an advertising application owner, that their application is observing higher delay than expected. The application, may, for example, use distributed jobs that operate on a deadline, whereby some job output may be ignored if the job does not complete within the specified deadline. The real world impact may translate to lost revenue, as data mining may be less effective, and the end user may be less likely to click on advertisements on a web page, for example. In response to the concern, the network operator may provide a faster/higher priority path through the network device for network flows closer to their deadlines. The network device may accomplish this by implementing deadline sensitive queues that the network device services with the highest priority. The network device operator may then specify the packet fields to match against to identify the advertising application, as well as the deadlines applicable to the advertising network flows. The network device will then match the advertising flow network packets and apply a packet marker to those network packets. The traffic manager in the network device may then map these marked network flows to the deadline sensitive queues. The network device may thereby increase the probability of timely advertising network flow completion.

Any or all of the network devices along the path between the network flow source and destination (as well as the source and the destination) may mark packets and perform management actions. That is, each intermediate network device between a source and a destination may contribute to the visibility and flow management of any network packets moving through that network device. When the management action is internal only to a specify network device, then that network device may take the management action, remove the packet marker, and send the network packets on to the next hop.

Figure 7:
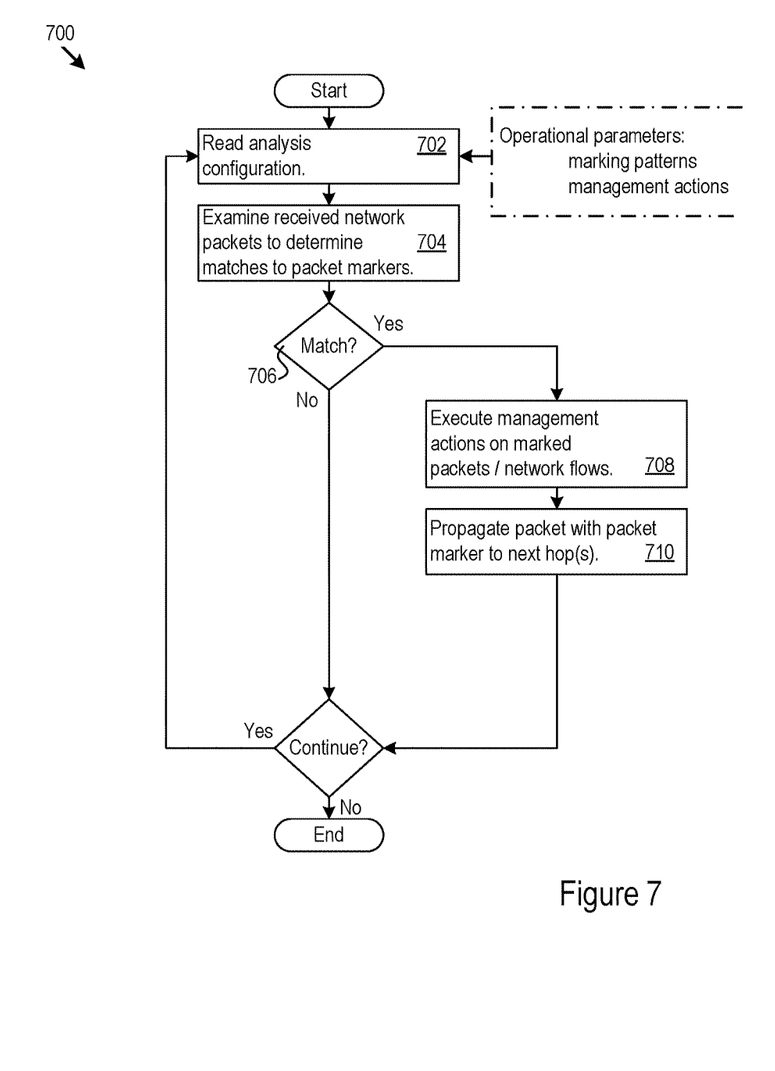
FIG. 7 shows an example of packet marker handling logic.

However, any network device may take the management action, and retain the packet marker on the network packets. The network packets are then propagated to subsequent hops in the path to the destination. Accordingly, each subsequent network device may also take management actions on the packet markers that propagate with the network packets into the subsequent network device. In that respect, FIG. 7 shows an example of packet marker handling logic 700 that any analysis logic 202 may implement. The logic 700 may read configuration information (702), including marking patterns to match against and specifiers of management actions to take for each of the marking patterns. The logic 700 also examines received network packets to determine matches to packet markers (704). When there is a match (706), the logic 700 may execute any specified management actions on the marked network packet or its network flow (708). The network device may also propagate the network packet with its packet marker to the next hop(s) (710). If course, the logic 700 may also replace the packet marker with a different packet marker that applies, or may remove the packet marker altogether.

One example application of the propagated packet markers is taking a management action relative to a global view of time. In that regard, the network device may mark the network packet, and may add to it a timestamp (e.g., the IEEE 1588 timestamp noted above). Then, for instance, a subsequent network device may take a management action (e.g., route the packet to a high priority queue) if greater than a specified time threshold has elapsed since the last timestamp added to the marked network packet.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   in a network device that connects a source device to a destination device through the network device:
   receiving, by a communication interface, a network packet that is part of a first network flow that is a background network flow, the network packet destined for the destination device and passing through the network device; and
   in response to the first network flow being a background network flow, marking, by a processor, the network packet with a power consumption packet marker, the power consumption packet marker indicating to the network device to rate throttle transmission of the network packet to keep power consumption of the network device less than a power threshold.

2. The method of claim 1, further comprising:
   receiving, by the communication interface, a second network flow that is a deadline aware network flow; and
   marking, by the processor, at least part of the second network flow with a packet marker indicative of a deadline proximity.

3. The method of claim 2, further comprising:
   selecting, by the processor, a marking function to execute, the marking function generates different packet markers to be applied to respective network packets based on different deadline proximities of a deadline applicable to the deadline aware network flow.

4. The method of claim 3, further comprising:
   determining, by the processor, a deadline applicable to the deadline aware network flow.

5. The method of claim 4, further comprising:
   determining, by the processor, that the deadline applicable to the deadline aware network flow has passed, the deadline indicative of a time at which the network packet is scheduled to be received by the destination device;
   dropping the network packet of the deadline aware network flow in response to receipt of the network packet of the deadline aware network flow past the deadline; and determining to not execute the marking function for said network packet of the deadline aware network flow.

6. The method of claim 4, further comprising:
determining, by the processor, that the deadline for the deadline aware network flow is approaching, based on time duration left for the deadline to occur;
determining, by the processor, to execute the marking function; and
executing the marking function to obtain a packet marker that represents that the deadline for said network packet of the deadline aware network flow is approaching.

7. The method of claim 4, further comprising:
determining, by the processor, that the network packet of the deadline aware network flow is considered on-time with respect to the deadline;
determining, by the processor, to execute the marking function; and
executing the marking function to obtain a packet marker that represents that said network packet of the deadline aware network flow is considered on-time with respect to the deadline.

8. The method of claim 4, further comprising:
determining, by the processor, that the network packet of the deadline aware network flow is considered early with respect to the deadline;
determining, by the processor, to execute the marking function; and
executing the marking function to obtain a packet marker that represents that said network packet of the deadline aware network flow is considered early with respect to the deadline.

9. The method of claim 4, further comprising:
obtaining, by the processor, the deadline from a device external to the network device.

10. The method of claim 3, further comprising:
determining, by the processor, to execute the marking function;
marking, by the processor, the network packet with a packet marker generated by the marking function; and
taking a flow management action internal to the network device on the network packet in response to the packet marker.

11. The method of claim 10, further comprising:
determining, by the processor, whether to retain the packet marker on the network packet for transmission to a next device that is on a network path to the destination device.

12. A network device comprising:
a packet buffer in the network device and on a path between a source device and a destination device that passes through the network device, the packet buffer operable to store:
network packets of a first network flow between the source device and the destination device; and
network packets of a second network flow; and
circuitry, in communication with the packet buffer, the circuitry configured to:
obtain an analysis criterion and apply the analysis criterion to determine that the first network flow is a deadline aware network flow and determine that the second network flow is a background network flow; and
execute a packet marking action in the network device in response to the first network flow being determined as a deadline aware network flow, wherein the packet marking action comprises deadline aware network flow packets in the packet buffer being marked with a packet marker that is indicative to the circuitry to modify throughput for the deadline aware network flow; and
identify the packet marker as an internal packet marker, wherein the packet marker is removed prior to propagation of the network packet by the network device to a next network device in response to the packet marker being identified as the internal packet marker and the packet marker is retained during the propagation of the network packet to the next network device in response to the packet marker not being the internal packet marker.

13. The device of claim 12, further comprising circuitry operable to
execute the packet marking action by marking at least a part of the background network flow with a packet marker that signifies desired throughput reduction for the background network flow.

14. The device of claim 12, further comprising circuitry operable to:
determine a deadline applicable to the deadline aware network flow; and
mark the deadline aware network flow packets with a packet marker that depends upon the deadline applicable to the deadline aware network flow.

15. The device of claim 14, wherein the packet marker represents that the deadline aware network flow is early with respect to the deadline.

16. The device of claim 14, wherein the packet marker represents that the deadline aware network flow is on-time with respect to the deadline.

17. A network device comprising: a packet buffer included in the network device, the network device being on a path between a source device and a destination device that passes through the network device, the packet buffer operable to store network packets of a first network flow between the source device and the destination device; and circuitry configured to:
determine whether any of the network packets includes a packet marker;
determine that the packet marker signifies that the first network flow has an impact on timely delivery of a deadline aware network flow;
execute a management action on the first network flow when the packet marker signifies that the first network flow impacts timely delivery of the deadline aware network flow by a deadline associated with the deadline aware network flow;
retain the packet marker of a network packet included among the network packets, in response to the packet marker being identified for propagation to a next network device for further management actions by the next network device;
and remove the packet marker of said network packet, prior to propagation of said network packet to the next network device, in response to the packet marker being identified as a packet marker internal to the network device.

18. The method of claim 3, further comprising:
generating a packet marker that requests reduced throughput based on a deadline proximity of the deadline aware network flow, wherein the generated packet marker is marked on a network packet of the background network flow and/or the deadline aware network flow.

19. The method of claim 1, further comprising
classifying, by the processor, the first network flow as the background network flow by comparing the network packet against a classification criterion, the classification criterion comprising a source port address, a destination port address, a source network address, a destination network address, and a data pattern in the network packet.

20. The method of claim 19, further comprising:
obtaining, by the processor, the classification criterion from a device external to the network device.

* * * * *